(12) United States Patent
Goel et al.

(10) Patent No.: US 10,834,222 B1
(45) Date of Patent: Nov. 10, 2020

(54) SERVER UTILIZING MULTIPLE OBJECT RETRIEVAL CANDIDATES

(71) Applicant: Akamai Technologies Inc., Cambridge, MA (US)

(72) Inventors: Utkarsh Goel, San Mateo, CA (US); Martin T. Flack, Denver, CO (US)

(73) Assignee: Akamai Technologies Inc., Cambridge, MA (US)

( * ) Notice: Subject to any disclaimer, the term of this patent is extended or adjusted under 35 U.S.C. 154(b) by 0 days.

(21) Appl. No.: 16/655,370

(22) Filed: Oct. 17, 2019

Related U.S. Application Data

(60) Provisional application No. 62/845,531, filed on May 9, 2019.

(51) Int. Cl.
G06F 15/16 (2006.01)
H04L 29/08 (2006.01)

(52) U.S. Cl.
CPC ........ *H04L 67/2838* (2013.01); *H04L 67/288* (2013.01); *H04L 67/2819* (2013.01)

(58) Field of Classification Search
CPC ................ H04L 67/2819; H04L 67/2838; H04L 67/288
USPC ........................................................ 709/230
See application file for complete search history.

(56) References Cited

U.S. PATENT DOCUMENTS

| | | | |
|---|---|---|---|
| 6,108,703 A | 8/2000 | Leighton et al. | |
| 6,996,616 B1 | 2/2006 | Leighton et al. | |
| 7,058,706 B1 | 6/2006 | Iyer et al. | |
| 7,096,263 B2 | 8/2006 | Leighton et al. | |
| 7,096,266 B2 | 8/2006 | Lewin et al. | |
| 7,133,905 B2 | 11/2006 | Dilley et al. | |
| 7,240,100 B1 | 7/2007 | Wein et al. | |
| 7,251,688 B2 | 7/2007 | Leighton et al. | |
| 7,274,658 B2 | 9/2007 | Bornstein et al. | |
| 7,293,093 B2 | 11/2007 | Leighton et al. | |
| 7,484,002 B2 | 1/2009 | Swildens et al. | |
| 7,523,181 B2 | 4/2009 | Swildens et al. | |
| 7,574,499 B1 | 8/2009 | Swildens et al. | |
| 7,603,439 B2 | 10/2009 | Dilley et al. | |
| 7,716,367 B1 | 5/2010 | Leighton et al. | |
| 7,725,602 B2 | 5/2010 | Liu et al. | |

(Continued)

OTHER PUBLICATIONS

"Backend servers—Varnish version 5.1.3 documentation", Varnish 5.1.3. released Aug. 2, 2017 according to https://varnish-cache.org/releases/rel5.1.3.html, 7 pages, downloaded from Oct. 16, 2019 from https://varnish-cache.org/docs/5.1/users-guide/vcl-backends.html#health-checks.

(Continued)

*Primary Examiner* — Frantz B Jean

(57) ABSTRACT

Enable a CDN server to potentially go forward to any of multiple candidate servers (or other infrastructure) to retrieve a client-requested object, based on periodic testing of such candidate servers or infrastructure for cache hits and network latency (among other things), and scoring thereof. Such candidate servers or infrastructure represent alternative places to get the object. Importantly, a candidate may be a server or infrastructure owned and/or operated by another CDN, including a CDN industry competitor, and may be discovered in a preliminary process that involves detection of multi-CDN arrangements on the Internet where the foregoing approach may be viable.

20 Claims, 2 Drawing Sheets

(56) References Cited

U.S. PATENT DOCUMENTS

| | | | |
|---|---|---|---|
| 7,912,978 | B2 | 3/2011 | Swildens et al. |
| 7,925,713 | B1 | 4/2011 | Day et al. |
| 7,979,580 | B2 | 7/2011 | Swildens et al. |
| 7,996,531 | B2 | 8/2011 | Freedman |
| 8,041,818 | B2 | 10/2011 | Gupta et al. |
| 8,169,916 | B1 | 5/2012 | Pai et al. |
| 8,195,831 | B2 | 6/2012 | Swildens et al. |
| 8,683,002 | B2 | 3/2014 | Harvell et al. |
| 8,849,976 | B2 | 9/2014 | Thibeault |
| 9,026,661 | B2 | 5/2015 | Swildens et al. |
| 9,769,238 | B2 | 9/2017 | Ludin et al. |
| 9,787,745 | B1 * | 10/2017 | Binns ................. H04L 65/4076 |
| 10,148,735 | B1 | 12/2018 | Kolam |
| 10,187,319 | B1 | 1/2019 | Kumar et al. |
| 10,440,148 | B1 * | 10/2019 | Richter .................. H04L 67/16 |
| 10,735,489 | B1 * | 8/2020 | Joliveau ................ H04L 65/601 |
| 2012/0158527 | A1 * | 6/2012 | Cannelongo ....... H04N 21/2668 705/14.73 |
| 2012/0246290 | A1 | 9/2012 | Kagan |
| 2012/0246315 | A1 | 9/2012 | Kagan |
| 2014/0129720 | A1 * | 5/2014 | Guo ........................ H04L 47/70 709/226 |
| 2014/0143438 | A1 | 5/2014 | Kagan et al. |
| 2014/0379902 | A1 | 12/2014 | Wan et al. |
| 2015/0215267 | A1 | 7/2015 | Kagan |
| 2016/0043923 | A1 | 2/2016 | Kagan et al. |
| 2016/0043990 | A1 | 2/2016 | Kagan |
| 2017/0034119 | A1 | 2/2017 | Kagan |
| 2017/0134338 | A1 | 5/2017 | Kagan |
| 2018/0041466 | A9 | 2/2018 | Kagan |
| 2019/0306271 | A1 * | 10/2019 | Blum ...................... H04L 67/32 |

OTHER PUBLICATIONS

"IETF 104, TLS II, Will an ESNI RRType Diverge From the A/AAAA Results?", Screenshot of YouTube video, 1 page, for TLS Meeting Session, Mar. 26, 2019, Prague, Czech Republic, video posted Mar. 28, 2019, https://www.youtube.com/watch?v=1Wj_PdHLTEI&feature=youtu.be&t=4281.

"Varnish-4.0-configuration-templates/default.vcl", last edited Mar. 12, 2019, downloaded on Oct. 16, 2019, 7 pages. https://github.com/mattiasgeniar/varnish-4.0-configuration-templates/blob/master/default.vcl.

"Web Page Optimization Check Results—Dulles—www.nytimes.com,", downloaded on Oct. 4, 2019, 3 pages. https://www.webpagetest.org/result/191004_Q2_2632920189fc354177c2066ce83c3f67/1/performance_optimization/.

"WebPagetext Quick Start Guide, downloaded on Oct. 4, 2019, 18 pages.", https://sites.google.com/a/webpagetest.org/docs/using-webpagetest/quick-start-quide.

Bishop, "Transcript of IETF104 Presentation, Will an ESNI RRType Diverge From the A/AAAA Results?", TLS Meeting Session, Mar. 26, 2019, 6 pages.Video at https://www.youtube.com/watch?v=1Wj_PdHLTEI&feature=youtu.be&t=4281.

Bishop, Mike "Will an ESNI RRType Diverge From the A/AAAA Results?", Slides for presentation at TLS session meeting at IETF 104, Mar. 26 2019, 9 pages. Prague, Czech Republic downloaded Oct. 9, 2019 from https://datatracker.ietf.org/meeting/104/proceedings/.

Chankhunthod, et al., "USENIX, a Hierarchical Internet Object Cache.", Proceedings of the USENIX 1996 Annual Technical Conference, Jan. 1996, 12 pages.

Citrix, "Best practices for evaluating and implementing a multi-CDN strategy, copyright 2018, downloaded on Oct. 15, 2019, 16 pages.", https://www.citrix.com/content/dam/citrix/en_us/documents/white-paper/bestpractices-for-evaluating-and-implementing-a-multi-cdn-strategy.pdf.

Citrix, "Customize content delivery in the cloud, downloaded on Oct. 15, 2019, Copyright indicated 1999-2019, 3 pages.", https://www.citrix.com/networking/content-delivery-in-the-cloud.html.

Citrix, "Intelligent Traffic Management—Optimize Network Health, downloaded on Oct. 15, 2019," Copyright indicated 1999-2019, 5 pages. https://www.citrix.com/products/citrix-intelligent-traffic-management/.

Citrix, "Intelligent Traffic Management, Real User Monitoring for Application Delivery, downloaded on Oct. 15, 2019, 3 pages.", https://www.citrix.com/networking/real-user-monitoring.html.

Citrix, "Intelligent Traffic Management, Sep. 25, 2019, 284 pages."

Edmonds, "ISC Passive DNS Architecture, Mar. 2012, 18 pages."

Edmonds, Robert, "Passive DNS Hardening, 40 pages, Aug. 2010.", Internet Systems Consortium, https://www.farsightsecurity.com/assets/media/download/passive_dns_h ardening_handout.pdf.

Farsight Security, "Discover Hidden Clues with Farsight DNSDB®,", Copyright 2019, downloaded Oct. 4, 2019 from https://info.farsightsecurity.com/dnsdb-ebook.

Farsight Security, "DNSDB API Documentation, downloaded on Oct. 4, 2019, 24 pages.", Last page change log showing initially available as of 2011 and showing changes 2011 to 2019, 24 pages. Available at https://api.dnsdb.info/, Available at https://api.dnsdb.info/.

Farsight Security, "DNSDB Query Modes, downloaded on Oct. 4, 2019, Copyright 2013-2019, 2 pages."

Farsight Security, "Farsight Security Passive DNS Sensor, downloaded on Oct. 4, 2019, 5 pages.", Copyright 2013-2019.

Farsight Security, "Passive DNS historical Internet Database, downloaded on Oct. 4, 2019, 9 pages.", Copyright 2013-2019, https://www.farsightsecurity.com/solutions/dnsdb/.

Farsight Security, "Passive DNS project introduction, downloaded on Oct. 4, 2019, 2 pages.", Copyright 2013-2019, https://www.farsightsecurity.com/technical/passive-dns/.

Farsight Security,Product Data Sheet, DNSDB, 2 pages, copyright 2018.

Geniar, "Mark a varnish backend as healthy, sick or automatic via CLI,", dated Aug. 11th, 2016, 4 pages, https://varnish-cache.org/releases/rel5.1.3.html.

Google, "optimization_checks.py", for wptagent/optimization_checks.py at master • WPO-Foundation/wptagent • GitHub, Github repository, Copyright 2017, downloaded on Oct. 4, 2019, 22 pages, available at https://github.com/WPO-Foundation/wptagent/blob/master/internal/optimization_checks.py#L48.

IDS Transmittal Letter, submitted with this SB-08, 2 pages.

Peterson, et al., "IETF, RFC 7336, Framework for Content Distribution Network Interconnection (CDNI), Aug. 2014, 58 pages.", http://www.rfc-editor.org/info/rfc7336.

Wessels, et al., "ICP and the Squid Web Cache, Aug. 13, 1997, 25 pages."

Wessels, et al., "RFC 2187, Application of Internet Cache Protocol (ICP), version 2, Sep. 1997, 24 pages." https://tools.ietf.org/pdf/rfc2186.pdf.

* cited by examiner

SERVER UTILIZING MULTIPLE OBJECT RETRIEVAL CANDIDATES

CROSS REFERENCE TO RELATED APPLICATIONS

This application is based on, and claims the benefit of priority of, U.S. Provisional Application No. 62/845,531, which was filed on May 9, 2019.

BACKGROUND

Technical Field

This application generally relates to the detection and selection of candidate sources from which a network cache can fetch content for a requesting client, so as to support delivery of web pages, web applications, web APIs or other kinds of content over computer networks.

Brief Description of the Related Art

Content delivery networks (CDNs) typically use proxy cache servers (typically reverse proxy cache servers) to improve the delivery of websites, web applications, and other online content such as streaming media. A CDN usually has many proxy servers distributed across the Internet, e.g., located in end user access networks (sometimes referred to as edge servers), peering points, or otherwise. An end user client desiring content locatable under a domain being handled by the CDN is directed by a request routing mechanism to a selected proxy server in the CDN. This may be accomplished for example using a DNS-based request routing mechanism, in which the CDN's domain name service returns an IP address of a proxy server in response to a name lookup for the domain, as known in the art.

For example, in a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers (which may be servers operated by the content provider or servers operated by a DNS service provider for the content provider), those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a Host header that includes the original content provider domain or sub-domain. Upon receipt of the request with the Host header, the CDN server checks its configuration file to determine whether the content domain or sub-domain requested is actually being handled by the CDN. If so, the CDN server applies its content handling rules and directives for that domain or sub-domain, or for URI paths in the request, as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

Due to the aforementioned request routing mechanism, the end-user client makes a content request for a desired object to the CDN's proxy server (e.g., using HTTP or other application layer protocol that may be used to facilitate an API). The proxy server maintains a content cache (also referred to, equivalently, as an object cache). The proxy server searches this cache for the object that the client requested. If it locates an object and the object is not expired and otherwise valid to serve (cache hit), the end-user request can be served out of cache. If not (cache miss), the proxy server may need to fetch the object from another server in the CDN (e.g., using a cache hierarchy model, as described in U.S. Pat. No. 7,603,439), often referred to as a parent server, or from an origin server associated with the content provider that is associated with the domain of the requested content. Requests sent to the parent server that are lacking the requested object can be then issued to the origin infrastructure; the origin is responsible for issuing an authoritative answer for the object.

In some cases, a client may request a non-cacheable object. The CDN's proxy server can fetch this object from origin directly or via a parent, in much the same way as described above for a cache miss.

In these ways, the content provider can make its website, web application, enterprise tool, or other online property available to end-users via the CDN in an improved fashion.

More information about cache hierarchies and a tiered distribution system in a CDN is found in U.S. Pat. No. 7,133,905, the teachings of which are hereby incorporated by reference in their entirety. A description of optimal route selection in a CDN (e.g, to reach a parent or origin server) is described in U.S. Pat. No. 7,274,658, the teachings of which are hereby incorporated by reference in their entirety. Additional information on CDN technologies can be found in the following documents, the teachings of which are hereby incorporated by reference in their entireties: U.S. Pat. Nos. 6,108,703; 7,293,093; 7,096,263; 7,096,266; 7,484,002; 7,523,181; 7,574,499; 7,240,100; 7,603,439; 7,725,602; 7,716,367; 7,996,531; 7,925,713; 7,058,706; 7,251,688; 7,274,658; 7,912,978; 8,195,831.

Cache hierarchies can use a protocol called ICP to communicate. As described in Duane Wessels et al. "ICP and the Squid Web Cache" (1997) and standardized in IETF RFC 2187 (1997), Internet Cache Protocol (ICP) is a known-in-the-art lightweight communication format used for communication amongst web caches. (See also Anawat Chankhunthod et al., A Hierarchical Internet Object Cache, USENIX 1996 Annual Technical Conference, San Diego Calif. 1996). Caches exchange ICP queries and replies to gather information to use in selecting the most appropriate location from which to retrieve an object. A cache may collect network measurements from its peers, which may act as parents or siblings, and add these measurements to its local table, learning over time which peers are good choices for which sources. (See Wessels 1997, section 7.1, p. 18). However, while cache peering relationships may be formed across organizational and national boundaries (see Wessels 1997, sections 1.2 and 6.1, see also RFC 2187), ICP suffers because configuration is static and limited to known (i.e., pre-configured) sources of content. It does not dynamically detect a potential source of content.

The Varnish proxy cache, which is known in the art by others, enables users to define an origin server as a "back-end" from which the proxy cache will get content. A "director" can be defined to distribute its requests across backends. A director can be set up with health checks so that the health of the backends can be probed automatically and periodically, so that Varnish can direct requests to the healthy server. A developer can write code (using VCL) for Varnish to make custom decisions based on the status of a backend. See Varnish 5.1.3 documentation, available at the HTTP webpage at varnish-cache.org/docs/5.1/users-guide/vcl-backends.html (Varnish 5.1.3 released 2017 Aug. 2 according to the HTTP webpage at varnish-cache.org/releases/rel5.1.3.html), see also Mark a varnish backend as healthy, sick or automatic via CLI, at ma.ttias.be/mark-varnish-backend-healthy-sick-automatic-via-cli/. Like ICP, however, this is merely manual and static configuration of a proxy cache.

It is also known in the art, by others, for content providers to employ a strategy of using multiple different delivery platforms, e.g., more than one commercial CDN infrastructure, to deliver their content online. For example, a content provider may make arrangements such that over a given period of time, when an end user clients request resolution of one or the content provider's DNS hostnames (e.g., for one of their websites), the hostname will resolve to point to a first CDN sixty percent of the time, while the other forty percent point to a second CDN. (This resolution may be accomplished via CNAME from the content provider name to a CDN name, which is then resolved through the CDN's DNS service to an IP address of a CDN server; thus, in a multi-CDN strategy the CNAME and IP address may point to one CDN infrastructure some percentage of lookups and another CDN infrastructure at other times.). In addition to percentages over time, the resolution and determination of which CDN to use could also be based on the geography, or other characteristics of the end user client (or the end user client's DNS or access network), or the performance of the CDN. A known service provider named Cedexis (now Citrix) provides a DNS service that enables multi-CDN delivery, by automatically distributing client request traffic across multiple CDNs (e.g., based on some metric like load, responsiveness, client network, or percentages). US Patent Publication No. 2012/0246290 by Cedexis describes "a method for providing access to an Internet resource includes receiving a DNS query including a hostname to be resolved, receiving status data, invoking a code by a name indicated by the hostname, conveying the status data to the code, receiving from the code a selection of an infrastructure [such as a CDN], and generating a DNS response directing a resolution to the infrastructure." The selection can be made based on cost and performance information.

It is known in the art, by others, to be able to detect the aforementioned multi-CDN strategies. Known and public services like Farsight Security's DNS-DB, which collects DNS resolution over time and from many different Internet vantage points, and webpagetest.org, which also examines the DNS lookup process, make it possible to identify the CDN that is delivering a particular site, and whether the website is using a multi-CDN delivery strategy as mentioned above. It can be done by looking at the CNAME records, or the IP address and performing a reverse whois lookup. However, while manual and automated detection of multi-CDN strategies is known in the art by others, such intelligence is used as business insight. The teachings of this document apply that intelligence in new ways to facilitate and improve the operation of a proxy server in delivering content requested from that server by a client.

Put another way, the teachings hereof enable a CDN and its servers to discover and utilize new options for fetching objects, including in particular for multi-CDN arrangements, e.g., upon a cache miss or for non-cacheable content. The teachings presented herein improve the functioning of a computer system itself, improving the object fetch function in an individual server as well as that of a larger distributed system composed of many such servers. Those skilled in the art will understand these and other improvements from the teachings hereof.

BRIEF DESCRIPTION OF THE DRAWINGS

The invention will be more fully understood from the following detailed description taken in conjunction with the accompanying drawings, in which.

Figure 1:
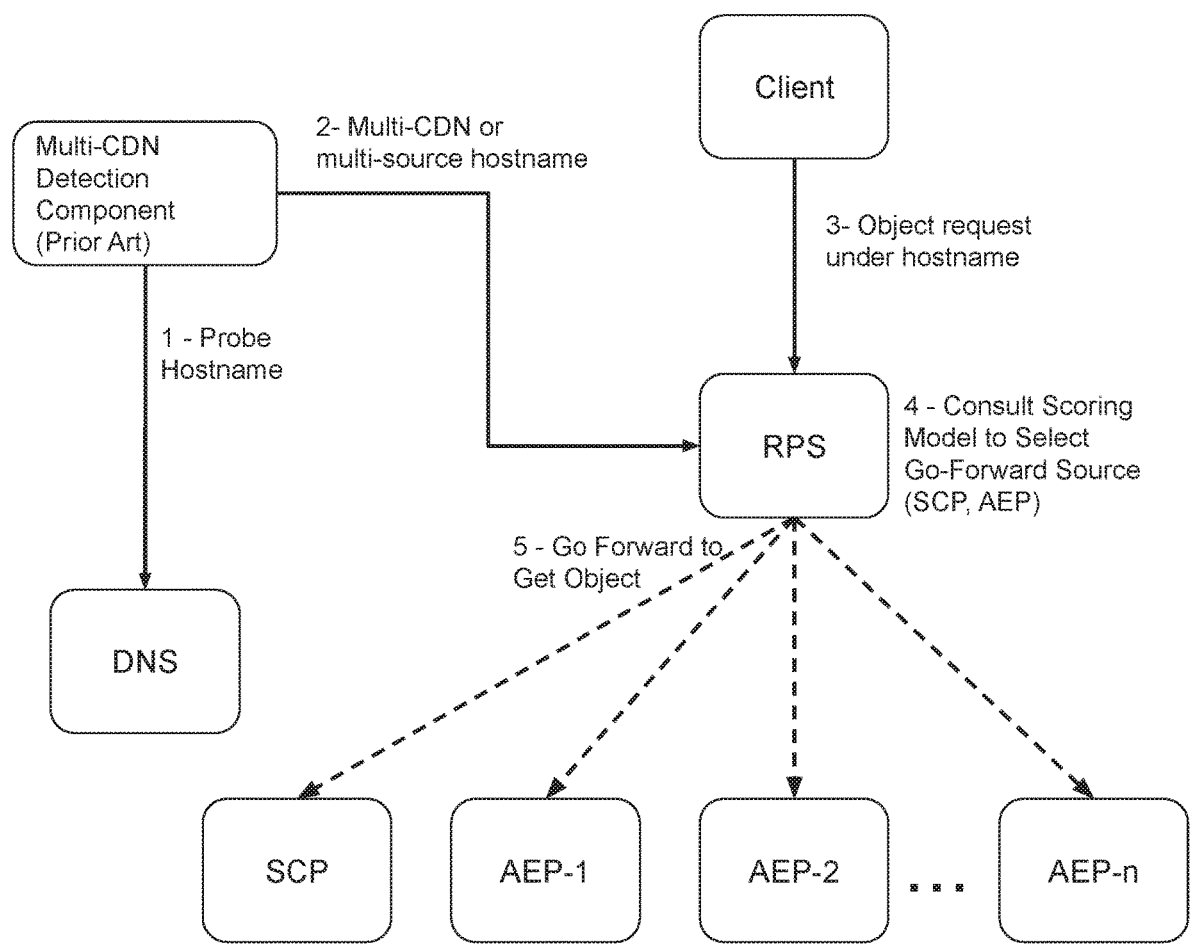
FIG. 1 is a block diagram illustrating an embodiment of a system in accord with the teachings hereof; and, FIG. 2 is a block diagram illustrating hardware in a computer system that may be used to implement the teachings hereof.

Numerical labels are provided in some FIGURES solely to assist in identifying components being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, HTTP over QUIC, MQTT, TCP/IP, and UDP, is assumed. All references to HTTP should be interpreted to include an embodiment using encryption (HTTP/S), such as when TLS secured connections are established. The terms "client" and "client device" are used herein to refer to hardware in combination with software (e.g., a browser or player application). While context may indicate the hardware or the software exclusively, should such distinction be appropriate, the teachings hereof can be implemented in any combination of hardware and software. Hardware may be actual or virtualized.

Overview

The teachings hereof enable a CDN server (typically a caching proxy server, sometimes referred to as an 'edge' server when deployed at a network edge) to go forward to any of multiple candidate servers (or other infrastructure) to retrieve a client-requested object. The choice of candidate can be based on periodic testing of such candidate servers or infrastructure for cache hits and network latency (among other things), and scoring thereof. Such candidate servers or infrastructure represent alternative places to get the object. Importantly, a candidate may be a server or infrastructure owned and/or operated by another CDN, even a CDN industry competitor, and may be discovered in a preliminary process that involves detection of multi-CDN arrangements on the Internet where the foregoing multi-candidate approach may be viable.

In sum, upon a CDN server receiving a request for a particular object from a client and experiencing a cache miss for that particular object, the CDN server can identify and select amongst multiple potential candidates to which it can issue a forward request to get that object; each candidate can be associated with statistics in a model accessible to the CDN server, using which the CDN Server can select an appropriate candidate to which to go forward to, at request time.

Server Candidates & Nomenclature

As mentioned, many of the teachings herein revolve around the availability of multiple server candidates from which a client-requested object can be retrieved. Such candidates may be referred to as or considered to be "parent" servers or parent infrastructure, regardless of whether a formal child-parent relationship is configured.

In the nomenclature used herein, the "responding proxy server" or RPS means the particular proxy server in a given CDN that receives a client request and needs to respond with the requested object, and hence may need to fetch it.

Further, the "Same-CDN Parent" or SCP refers to the parent server(s) or infrastructure that is in the same CDN as the RPS, which the RPS server would normally (prior to the teachings of this document) contact to obtain a client-requested object.

Finally, an alternate external parent "AEP" refers to the candidate that the RPS may consider as an external source from which to fetch the object. The term "external" is taken to indicate that the parent is in an external system, based on the perspective of the CDN server that received the client request for the object. Hence the AEP is not within the same CDN as the RPS. The AEP may be another server and/or infrastructure that is provided (or arranged/designated) by the owner of the origin infrastructure, and that has whole or partial availability or coverage of the origin's catalog of objects. For example, an AEP may be, non-exhaustively, a server that is part of another commercial CDN, also configured to serve the same hostname publicly; a Do-It-Yourself (DIY) CDN, meager or advanced, established by a website owner as an alternative to a commercial CDN; a public reverse proxy offered by a network operator to facilitate access to the web in general or in whole or part to the hostname in question; a partially-migrated copy (or a copy with improvements) of the origin infrastructure which has not been made primary yet, but is functional to serve objects; and, any alternate web server with some or all of the objects of a hostname.

Process for Fetching Objects from AEPs

At a high level, a process in accord with the teachings hereof involves:
A. Discover AEPs
B. Send Discovered Hostnames to RPS
C. Create scoring models For AEPs at RPS
D. Receipt, from a client, of object request at RPS of a CDN
E. If cache miss, and If requested object has AEPs, consult applicable scoring model
F. Select where to go forward to fetch object after cache miss Step A typically occurs before an object request is received (and may be repeated periodically). Step B can be initiated prior to an object request and sent to an RPS, performed at the RPS prior to an object request, or based upon receiving an object request from a client, or performed with the object forwarding request by actively probing alternatives and measuring statistics. Steps C, D, E occur at the time of the object request.

These high level steps are now described in more detail.

A. Detection

The detection process involves the RPS or other component in its CDN determining, for a given content provider hostname, whether AEPs exist. Typically this involves testing to see whether hostname is configured for a multi-CDN strategy, i.e., whether the content provider has adopted such a strategy. A multi-CDN strategy typically involves, depending on various factors, the notion that different CDNs may respond to an object request and deliver such objects. As noted in the Background section, there are several ways known in the art to detect multi-CDN arrangements, both manual and automated, and hence this Step A is known as prior art by others.

To provide more detail, one known technique used in detection is examining CNAMEs returned by one of the plurality of DNS servers that are accessible on the public Internet and preferably deployed worldwide in many different networks, to find a hostname associated with multiple CDNs. For example, a hostname www.example.com could be configured at the DNS level to point to a first CDN's CNAME for x % of times (that the hostname is requested of the DNS system) and to a second CDN (100-x) % of the times, where the first CDN is the CDN of the RPS, and the second CDN is the CDN of the AEP. Building on that example and giving another example, a hostname www.example.com could be configured at the DNS level to split traffic between the first CDN and a second CDN, using a certain split percentage, for DNS requests from clients (or DNS requests arriving at a server) in the European Union, and use a different split percentage, or even a different second CDN, in a similar position in the United States. Hence, the relevant CDNs can be discovered by periodically performing DNS lookups on the public hostname for a web site in question, and noting that at certain times or for certain geographies or jurisdictions a CNAME for an alternative (second, third, or more) CDN is presented by DNS for the hostname.

The RPS, or other component performing the detection, may be configured to contact any number of alternate CDNs/AEPs, depending upon the customer hostname or origin configuration or based on automatic detection of available AEP servers per-hostname.

Another technique used in detection is to perform reverse lookups on an IP address returned by one of the plurality of DNS servers to find a hostname associated with multiple CDNs. This means that the hostname is queried, an IP address received, and then, the resulting IP address is the target of a reverse lookup to find the CDN hostname. Of course, the process may involve many such hostname lookups, returned IP addresses, and reverse queries, as the IP addresses returned may vary depending on the requesting client. As noted, a dataset like Farsight Security's DNS-DB captures IP addresses returned from DNS at varying times and locations and can be used as the basis for this kind of intelligence.

If the reverse lookup on the IP address does not yield a CDN or other name, then the IP address can be used (researched) in other ways to try to find who owns it, e.g, using Akamai Edgescape or other publicly known and commercially available tools (e.g., from Neustar or Maxmind).

The detection process can be conducted by the RPS in the first CDN, but this is not a limitation hereof, as any component in the first CDN could execute the detection process and then collect the results.

The detection process is conducted (e.g., by the detection component) from multiple vantage points on the Internet. That is, the DNS lookups on the hostname ought to be initiated (or appear to be initiated) from multiple machines/points of presence on the Internet, in multiple countries, networks, times, etc, so as to discover the dimensions of any multi-CDN strategy. Or the process could be conducted from a single machine or data center (or the RPS), but contacting multiple DNS servers (such as open or publicly available DNS servers) located around the world. Again, this process is just like that used to create the commercially available DNS-DB, so that database could be used, assuming its coverage is sufficient.

Putting it all together, the algorithm for detection can be implemented as follows:
(1) Obtain a list of hostnames to probe (e.g., by pulling from a list of CDN customers, or publicly available hostnames)
(2) For a given hostname of interest, conduct testing by issuing DNS requests for that hostname against a plurality of DNS servers in different geographies and/or networks, and at different times. Capture the results of the DNS lookup.
(3) If the DNS lookup contains a CNAME, capture the CNAME and the hostnames in it. If the DNS lookup yields an IP address then execute a reverse IP address lookup against that IP address to obtain a hostname associated therewith.
(4) Store in a database, for each hostname of interest, the hostnames that were found in the CNAMES, and the names found from the reverse IP lookups (e.g., a record of {hostname_of_interest, hostname_cname, hostname-reverse-ip}. Then scan those records by executing a query (e.g., a SQL query or the like) against the records to identify strings or substrings that match against a list of known CDN names. Return those hostnames of interest that are associated with a match on two or more CDNs, and also return the CDNs. These are the detected multi-CDN hostnames.

B. Send Detected Multi-CDN Hostnames to RPS

If the detection phase is conducted separate from the RPS, then the list of identified multi-CDN hostnames is sent from the detection component to the RPS (and all of the other proxy servers in the CDN that will be enabled for this functionality described herein). The transmission of the list of hostnames can be accomplished using any known mechanism, such as publish-subscribe model, or even a metadata channel approach as mentioned in U.S. Pat. No. 7,240,100, the content of which are hereby incorporated by reference.

The RPS itself could host the detection component, and hence be itself conducting the detection phase; if so, then the list of identified multi-CDN names is simply sent from a detection process to a scoring model process.

C. Create Scoring Model

For each content provider hostname that is associated with AEPs and/or multiple CDNs, a scoring model is created to reflect the utility of contacting each AEP to fetch an object under the hostname. The model is preferably created at a given RPS, or its cluster, in response to a notification from the detection component that a hostname has AEPs associated with it. This is because the RPS (or another co-located server) will make performance measurements to populate the model and calculate the utility of contacting a given AEP, and such measurements will vary depending on the location as the RPS (or co-located server) attempts to fetch an object from the AEP.

In general, the aforementioned utility scores are based on performance metrics, such as network latency, hit rate, time to first byte, and the like.

The goal is to determine whether it is advantageous for the RPS, in a first CDN, to issue forward requests to an AEP in a second CDN, instead of to its own parent SCP (either fixed or as may be its own parent for that request as provided by RPS configuration) or to the origin. In some cases, the AEP may be the better choice, because AEPs may have different capabilities, capacities, connectivity, and policies.

In sum, an RPS in a CDN can maintain scoring models with statistics for the SCP and AEPs of the hostname in question. A model may be built using various URI's and be applied to new unseen URIs provided simply that they are requested from the same hostname; in some implementations, a model is not necessarily keeping a list of URIs that contributed to it. In some implementations, the models may be maintained on a more fine-grained basis, e.g., for URI paths (or path components) under the hostname, or for popularity groups determinable by the HTTP request alone or in conjunction with a digest of popular URI's, as configured.

For example, a model can have a running cache hit percentage (h) and network latency (n). Those two running numbers can be combined into a running utility score by $(1-h)*n$, using floating point arithmetic, where a lower resulting score is better. Thus at any given request, the RPS has multiple options to go forward, and may select the lowest score.

A configured threshold minimum can be applied to the cache hit rate for an AEP, and any AEP with a running hit rate lower than the threshold can be discarded as options (50% is suggested as a default). A configured maximum network latency can be applied to the network latency rates for an AEP, and any with a current network latency higher than the threshold are discarded as options (300 milliseconds is suggested as a default). Thresholds may also be expressed as relative to the SCP. The model may also record the total number of requests sent to the SCP and each AEP respectively, and apply a threshold minimum number of requests before an AEP is considered for a forward request. For an AEP to be selected over a SCP, there may be a minimum threshold improvement in the score, or both the score and some constituent metrics such as hit rate, required. The above configurations, thresholds, and other settings may be chosen by a CDN administrator to tune the operation of the CDN, or chosen by a content provider (perhaps within defined acceptable bounds) as a policy to apply to its traffic.

For each object request received at the RPS, there can be configured a small chance that the RPS concurrently sends a forward request to both SCP and an AEP. This can be done, intentionally, to augment the statistical model for that AEP; hence the RPS can be configured to exhibit behavior that may be triggered by randomness at some threshold (e.g., a specified percentage of traffic) and/or time since last tested (throttle).

In some embodiments, an AEP can provide a HIT/MISS indicator on a response HTTP header to facilitate cache hit rate monitoring by the RPS. The AEP might provide this information as an automatic, default response, or upon being prompted from the RPS with a request HTTP header in the forward request. Alternatively, some other scheme can be used to determine whether the AEP is considered to have had a local cache hit.

Alternatively, an AEP may be configured to be a partial content corpus surrogate, meaning that it does not have access to all objects on a hostname (and may function as a web server rather than a proxy, thus unable to resolve further), in which case the HTTP status code is used to determine a cache hit—such as 2xx is a hit; 4xx is a miss—and in this case a non-2xx response from the AEP is not passed by the RPS to the client as the final answer but simply indicates to the RPS that the AEP was not useful to resolve the object and the request should be repeated to the SCP. One example of where this feature may be useful is to assist in origin infrastructure migrations, which may take a long time, during which it would be useful for the target infrastructure to be listed as an AEP and for every RPS to being serving cacheable content from it when it populates sufficiently and becomes a preferential forwarding host over the old infrastructure.

Collective Treatment of AEPs in a Scoring Model

If the CDN of the RPS is configured to potentially contact any of multiple servers or clusters for its SCP, or multiple IP addresses, they may be considered collectively for the purposes of the scoring model; however this is not required. Likewise, if an external CDN has multiple AEPs, e.g., servers or clusters, or multiple IP addresses, then they may be considered collectively for the purposes of the scoring model; however this is not required. Preferably, each inbound hostname from clients should be associated with its own models, even if the hostnames for SCP and AEP are common to other inbound hostnames.

D. Receipt of Client Request

The scoring models for each hostname (or URI path) are consulted by the RPS in the process of servicing a client request. Assume the RPS receives a client request for a particular object. If the object is a cacheable object, then the RPS can check its local cache for it. If the RPS experiences a cache miss, then the process of whether to use an AEP to go forward to request the object begins. (Note that the teachings hereof are not limited to cacheable objects. For example, the RPS could also invoke the process of determining whether to use an AEP in order to fetch a non-cacheable object.)

D. Consult Applicable Scoring Model (Determine Whether to Use AEP)

Given a cache miss, the RPS examines the request to determine, e.g., based on the hostname and/or a portion of the URI (e.g., pathname), whether the object is associated with AEPs available due to, e.g., a multi-CDN arrangement.

Based on the hostname and/or URI, the RPS can find the applicable scoring model, if it exists. The scores in the model drive the decision of where the RPS goes forward. In general, the RPS may go forward to an AEP instead of the SCP when the AEP's score is better than the SCP. Likewise if the SCP score, over time, becomes better than the AEP score, then the RPS may go forward to the SCP again. There may be multiple AEPs; the server may choose the best performing AEP at the given time of the object request.

EXAMPLE

Assume a hostname www.example.com is served by two CDNs. DNS balancing is used by the website owner as follows:

60% of DNS hits to example.com.cdn1.net via CNAME of www.example.com

40% of DNS hits to example.com.cdn2.net via CNAME of www.example.com

CDN1's detection component may be configured to automatically detect the cdn2.net CNAME, indicating the multi-CDN arrangement, and begin testing a model on all proxy servers of CDN1 to periodically test for hit rate and latency of cacheable content of www.example.com on CDN2. For example, not more often than every 10 seconds a 1% chance of a test.

This testing can begin either before or upon receipt of client request for an object under the hostname. The testing can begin upon receipt of a client request without the need for a sanity check beforehand; but this is not required. (However, if the results of trying to use CDN2 is a non-2xx or 1xx HTTP status code, then it might be worthwhile to at least temporarily stop using alternate CDNs, e.g., if non-1xx or 2xx and the RPS has sent less than 20 requests to CDN2 for this hostname in the past say 72 hours it doesn't trust the response until we verify again with CDN1.)

A particular RPS of CDN1 somewhere in the world may at an instant have this model for objects served under a given hostname:

| | www.example.com | | | |
|---|---|---|---|---|
| Forward Host | Hit Rate | Network Latency | Score (Lower Better) | Re-quests |
| CDN1 (SCP) blah.cache-h.cdn1.net | 80% | 40 ms | ((1 − 0.80) * 40) = 8.00 | 10000 |
| CDN2 (AEP) example.com.cdn2.net | 84% | 32 ms | ((1 − 0.84) * 32) = 5.12 | 10000 |

The RPS may then forward the next request, or begin forwarding multiple requests, for www.example.com to example.com.cdn2.net, based on the current scoring model's data.

The use of the performance measurements in scoring is flexible. For example, if the website owner instructed CDN1 to maximize origin offload for www.example.com, then the scoring system could favor entirely the best hit rate, and disregard network latency, except to disqualify outlier latencies that are deemed too long. This would potentially result in the RPS selecting the AEP when it is slower than SCP, but has shown to have a good track record for cache hit/miss ratio. This or any other policy of the content provider (the website owner) could be applied to affect score calculation.

As mentioned above, the statistical scoring models may be refined to work on URI paths such that, for example, a RPS calculates or otherwise has access to models that provide data about the hit rate, network latency, and score statistics of AEPs on the basis of object paths of (for example) /images/ and /catalog/ on the same hostname.

In some embodiments, the scoring models can be organized as a result of Bayesian analysis on the inbound requested URIs, tokenized by some scheme, and matched against a Bayesian model to determine a label. The training labels would be HIT or MISS based upon whether the AEP returned a cache hit or not. The Bayeseian model may be trained by hand or automatically. The model may be continuously predicting and training at the same time (predict before going forward, train after response comes back). The tokenization scheme may be splitting a URI path and query string on punctuation characters to form "words"—and could retain every two-consecutive-word phrase as well. The tokenization scheme may remove or normalize numbers or other codes, or skip query string argument values, in order to minimize token proliferation. Other request characteristics (e.g., user agent and/or other HTTP headers used in content negotiation) may be tokenized and incorporated into the analysis as well. By this automated method, the RPS may discover for example that a certain file extension, folder name, request header, or argument keyword yields a high level of hits at an AEP while everything else does not, and therefore go forward optimally.

The models may be organized in terms of object popularity, for example in the simplest case "popular" and "unpopular", via configured detection of the URI path the client is requesting, or by matching the request URI against a digest of popular objects known to the RPS, possibly using a hash table or bloom filter. Hence, a particular RPS would receive a request for an object, classify it into a category (e.g., popular, unpopular, or otherwise) using one of the aforementioned mechanisms, and then use the available model corresponding to that class to calculate a score based upon hit rates, network latency, etc., and thus determine whether to go forward to a SCP or an AEP.

If the hit rate of the AEP is low or the latency is high, the system may back off its probing, potentially according to the Fibonacci sequence of increasingly longer back off periods until it turns off.

The feature contemplated herein can be wrapped in additional logic that turns it on or off based on the geography or jurisdiction of the RPS, the agreements surrounding its deployment (e.g. a deployment within a telco which may have traffic controls specified), or by peculiarities of the current HTTP request, such as a developer cookie.

In some cases, if the AEP is being selected and the AEP score is extremely good, and the constituent elements are good—e.g., hit rate is very high and network latency is very low—then the RPS might even forego normal caching of its own, preferring to rely entirely on the AEP for availability of content.

Cached Content Detection

As mentioned above, a particular RPS in a CDN can determine in a wide variety of ways whether other servers and/or infrastructure (including those in other CDNs) may have certain content cached. As mentioned, such a server (or other components in its CDN) can actively probe such candidates for content and discover content.

Alternatively, in some embodiments such RPS can participate in a publish/subscribe system between two CDNs or other infrastructures that provides the server with data about content available at such other CDNs and/or infrastructures. The server thus could subscribe to a relevant channel (e.g., for a given CDN name, infrastructure name, hostname, URI path, or otherwise) to learn about the contents of a cache in another CDN and/or infrastructure that is publishing such data.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 2:
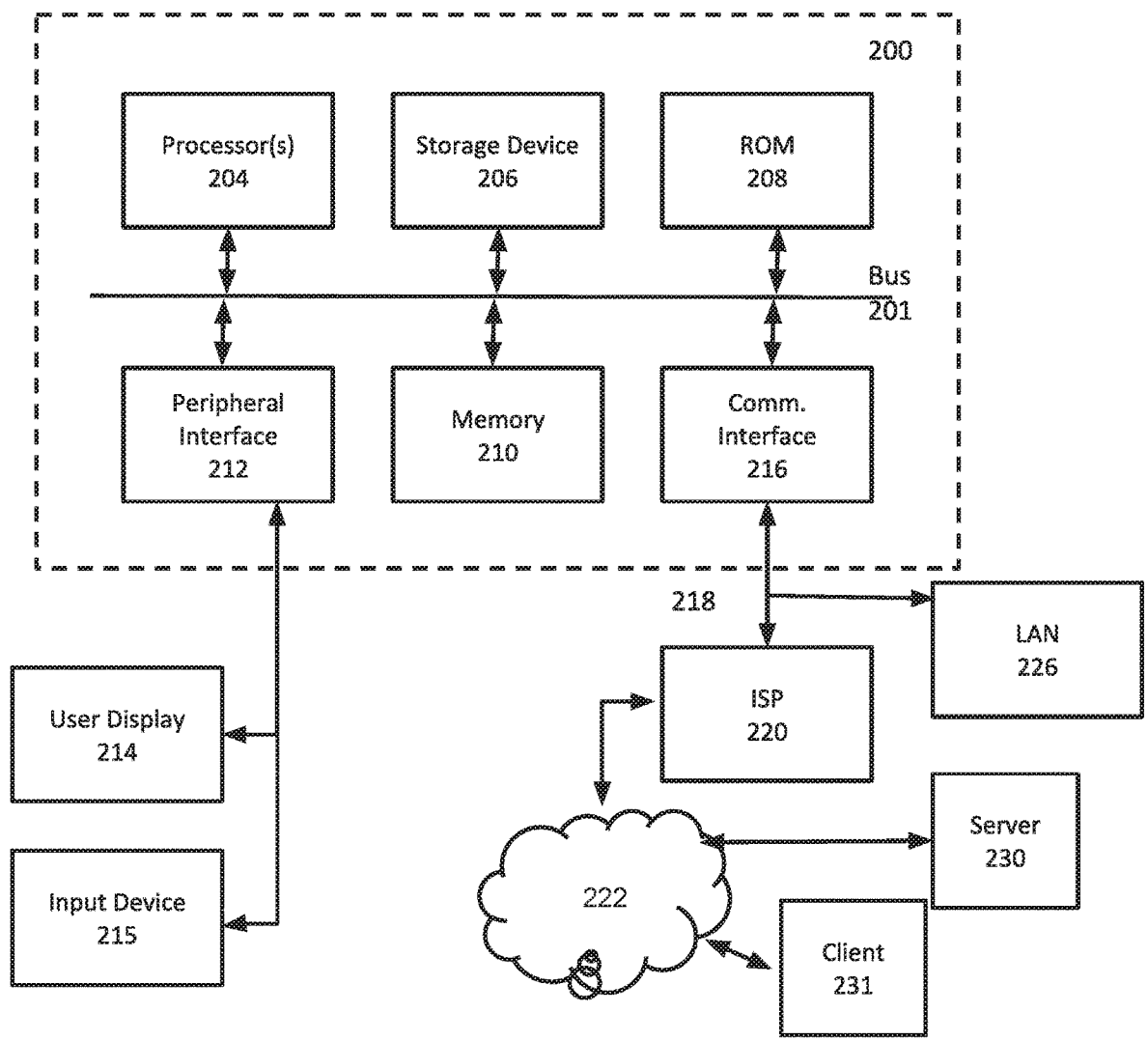

FIG. 2 is a block diagram that illustrates hardware in a computer system 200 upon which such software may run in order to implement embodiments of the invention. The computer system 200 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 200 includes a microprocessor 204 coupled to bus 201. In some systems, multiple processor and/or processor cores may be employed. Computer system 200 further includes a main memory 210, such as a random access memory (RAM) or other storage device, coupled to the bus 201 for storing information and instructions to be executed by processor 204. A read only memory (ROM) 208 is coupled to the bus 201 for storing information and instructions for processor 204. A non-volatile storage device 206, such as a magnetic disk, solid state memory (e.g., flash memory), or optical disk, is provided and coupled to bus 201 for storing information and instructions. Other application-specific integrated circuits (ASICs), field programmable gate arrays (FPGAs) or circuitry may be included in the computer system 200 to perform functions described herein.

A peripheral interface 212 may be provided to communicatively couple computer system 200 to a user display 214 that displays the output of software executing on the computer system, and an input device 215 (e.g., a keyboard, mouse, trackpad, touchscreen) that communicates user input and instructions to the computer system 200. However, in many embodiments, a computer system 200 may not have a user interface beyond a network port, e.g., in the case of a server in a rack. The peripheral interface 212 may include interface circuitry, control and/or level-shifting logic for local buses such as RS-485, Universal Serial Bus (USB), IEEE 1394, or other communication links.

Computer system 200 is coupled to a communication interface 216 that provides a link (e.g., at a physical layer, data link layer,) between the system bus 201 and an external communication link. The communication interface 216 provides a network link 218. The communication interface 216 may represent an Ethernet or other network interface card (NIC), a wireless interface, modem, an optical interface, or other kind of input/output interface.

Network link 218 provides data communication through one or more networks to other devices. Such devices include other computer systems that are part of a local area network (LAN) 226. Furthermore, the network link 218 provides a link, via an internet service provider (ISP) 220, to the Internet 222. In turn, the Internet 222 may provide a link to other computing systems such as a remote server 230 and/or a remote client 231. Network link 218 and such networks may transmit data using packet-switched, circuit-switched, or other data-transmission approaches.

In operation, the computer system 200 may implement the functionality described herein as a result of the processor executing code. Such code may be read from or stored on a non-transitory computer-readable medium, such as memory 210, ROM 208, or storage device 206. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 218 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. In a method of fetching an object requested by a client, the method performed in a system that has one or more proxy servers that field requests from end user client devices for objects, where the system has detected a particular hostname as being configured for a multi-CDN strategy that involves the use of first and second CDNs for delivery of objects under the particular hostname, the improvement comprising:
A. based upon the detection of the particular hostname configured for a multi-CDN strategy, the system communicating the particular hostname to any of a particular proxy server and a point of presence associated therewith;
B. based upon receipt of the particular hostname, any of the particular proxy server and another server in the point of presence establishing a multi-CDN scoring model that is associated with a task of the particular proxy server of the system retrieving an object under that hostname, wherein the scoring model includes both the first and second CDNs, the scoring model comprising:
 identification of first and second candidates from which to retrieve the object, the first candidate being any of a server and an infrastructure associated with the first CDN and the second candidate being any of a server and an infrastructure associated with the second CDN;
 a first score for the first candidate, the first score indicating the utility of contacting the first candidate to retrieve the object, applicable from a network vantage point of the particular proxy server in the system; and
 a second score for the second candidate, the second score indicating the utility of contacting the second candidate to retrieve the object, applicable from the network vantage point of the particular proxy server in the system;
 wherein said first and second scores vary across proxy servers in the system;
C. the multi-CDN scoring model being any of provided to or generated by the particular proxy server of the system;
D. at the particular proxy server of the system:
 receiving a request from a client for an object under the particular hostname that is configured for the multi-CDN strategy;
 determining that the object is not available to serve from a local cache at the particular proxy server;
 based on the particular hostname being in the multi-CDN scoring model, selecting one of the first and second candidates for retrieving the object, based on the first and second scores; and,
 as a result of said selection, sending a forward request to the selected candidate for the object.

2. The method of claim 1, wherein the particular proxy server selects the multi-CDN scoring model from a plurality of multi-CDN scoring models available to the particular proxy server, based at least in part on any one of the following:
 (i) the particular hostname, which is associated with the object;
 (ii) at least a portion of the object's pathname;
 (iii) at least a portion of a URI for the object;
 (iv) a class of objects into which the particular proxy server maps the object that the client requested.

3. The method of claim 1, wherein the first candidate comprises a server in the same system as the particular proxy server.

4. The method of claim 1, wherein the system comprises the first CDN.

5. The method of claim 1, wherein the second CDN comprises at least one of: a commercial CDN, a do-it-yourself CDN, and a network operator CDN.

6. The method of claim 1, any of the first and second scores comprising any of a cache hit-rate statistic, cache hit/miss ratio, network latency, network performance statistics, time to first byte statistic.

7. The method of claim 1, further comprising, in (D), receiving a response from the selected candidate for the object, and as a result updating the score for the selected candidate in the multi-CDN scoring model.

8. The method of claim 1, wherein the first and second scores are calculated in accord with a policy set by a content provider of the particular object.

9. The method of claim 8, wherein the policy comprises a policy to maximize offload.

10. In a system that includes a particular proxy server that fetches an object requested by a client, the system having one or more proxy servers that field requests from end user client devices for objects, where the system has detected a particular hostname as being configured for a multi-CDN strategy that involves the use of first and second CDNs for delivery of objects under the particular hostname, the improvement comprising:
- A. based upon the detection of the particular hostname configured for a multi-CDN strategy, a system component communicating the particular hostname to any of a particular proxy server and a point of presence associated therewith;
- B. based upon receipt of the particular hostname, any of the particular proxy server and another server in the point of presence establishing a multi-CDN scoring model that is associated with a task of the particular proxy server of the system retrieving an object under that hostname, wherein the scoring model includes both the first and second CDNs, the scoring model comprising:
    - identification of first and second candidates from which to retrieve the object, the first candidate being any of a server and an infrastructure associated with the first CDN and the second candidate being any of a server and an infrastructure associated with the second CDN;
    - a first score for the first candidate, the first score indicating the utility of contacting the first candidate to retrieve the object, applicable from a network vantage point of the particular proxy server in the system; and
    - a second score for the second candidate, the second score indicating the utility of contacting the second candidate to retrieve the object, applicable from the network vantage point of the particular proxy server in the system;
    - wherein said first and second scores vary across proxy servers in the system;
- C. the multi-CDN scoring model being any of provided to or generated by the particular proxy server of the system;
- D. at the particular proxy server of the system:
    - receiving a request from a client for an object under the particular hostname that is configured for the multi-CDN strategy;
    - determining that the object is not available to serve from a local cache at the particular proxy server;
    - based on the particular hostname being in the multi-CDN scoring model, selecting one of the first and second candidates for retrieving the object, based on the first and second scores; and,
    - as a result of said selection, sending a forward request to the selected candidate for the object.

11. The system of claim 10, wherein the particular proxy server selects the multi-CDN scoring model from a plurality of multi-CDN scoring models available to the particular proxy server, based at least in part on any one of the following:
- (i) the particular hostname, which is associated with the object;
- (ii) at least a portion of the object's pathname;
- (iii) at least a portion of a URI for the object;
- (iv) a class of objects into which the particular proxy server maps the object that the client requested.

12. The system of claim 10, wherein the first candidate comprises a server in the same CDN as the particular proxy server.

13. The system of claim 10, wherein the system comprises the first CDN.

14. The system of claim 10, wherein the second CDN comprises at least one of: a commercial CDN, a do-it-yourself CDN, and a network operator CDN.

15. The system of claim 10, any of the first and second scores comprising any of a cache hit-rate statistic, cache hit/miss ratio, network latency, network performance statistics, time to first byte statistic.

16. The system of claim 10, further comprising, in (D), receiving a response from the selected candidate for the object, and as a result updating the score for the selected candidate in the multi-CDN scoring model.

17. The system of claim 10, wherein the first and second scores are calculated in accord with a policy set by a content provider of the particular object.

18. The system of claim 17, wherein the policy comprises a policy to maximize offload.

19. In a method of fetching an object requested by a client, the method performed in a system that has one or more proxy servers that field requests from end user client devices for objects, where the system has detected a particular hostname as being configured for a multi-source strategy that involves the use of a CDN and at least one server deployed by a network operator for delivery of objects under the particular hostname, the improvement comprising:
- A. based upon the detection of the particular hostname configured for a multi-source strategy, the system automatically communicating the particular hostname to any of a particular proxy server and a point of presence associated therewith;
- B. based upon receipt of the particular hostname, any of the particular proxy server and another server in the point of presence establishing a multi-source scoring model that is associated with a task of the particular proxy server retrieving an object under that hostname, wherein the scoring model includes both the CDN and the at least one server deployed by the network operator, the scoring model comprising:
    - identification of first and second candidates from which to retrieve the object, the first candidate being any of a server and an infrastructure associated with the CDN and the second candidate comprising the at least one server deployed by the network operator;
    - a first score for the first candidate, the first score indicating the utility of contacting the first candidate to retrieve the object, applicable from a network vantage point of the particular proxy server in the system; and
    - a second score for the second candidate, the second score indicating the utility of contacting the second candidate to retrieve the object, applicable from the network vantage point of the particular proxy server in the system;
    - wherein said first and second scores vary across proxy servers in the system;
- C. the multi-source scoring model being any of provided to or generated by the particular proxy server of the system;
- D. at the particular proxy server of the system:
    - receiving a request from a client for an object under the particular hostname that is configured for the multi-source strategy;

determining that the object is not available to serve from a local cache at the particular proxy server, based on the particular hostname being in the multi-source scoring model, selecting one of the first and second candidates for retrieving the object, based on the first and second scores; and, as a result of said selection, sending a forward request to the selected candidate for the object.

20. The method of claim 19, wherein the system comprises the CDN.

* * * * *